(12) United States Patent
Koarai

(10) Patent No.: US 7,929,176 B2
(45) Date of Patent: Apr. 19, 2011

(54) IMAGE PROCESSING APPARATUS

(75) Inventor: Shoji Koarai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 589 days.

(21) Appl. No.: 12/035,512

(22) Filed: Feb. 22, 2008

(65) Prior Publication Data

US 2008/0204778 A1    Aug. 28, 2008

(30) Foreign Application Priority Data

Feb. 27, 2007    (JP) ................ 2007-046375

(51) Int. Cl.
*H04N 1/047* (2006.01)
*H04N 1/21* (2006.01)
*G06K 9/32* (2006.01)
*G06K 9/78* (2006.01)
*G06T 7/60* (2006.01)

(52) U.S. Cl. ......... 358/1.6; 358/1.9; 358/1.16; 358/448; 358/474; 358/488; 382/286; 382/289; 382/318

(58) Field of Classification Search .......... 358/1.6, 358/1.9, 3.26, 1.14, 1.13, 1.16, 505, 524, 358/527, 405, 437, 444, 448, 1.2, 449, 451, 358/468, 474, 488, 498; 382/286, 289, 295–299, 382/312, 318, 319
See application file for complete search history.

(56) References Cited

U.S. PATENT DOCUMENTS
2008/0094653 A1 * 4/2008 Miwa ................. 358/1.14

FOREIGN PATENT DOCUMENTS
| EP | 1 667 422 A1 | 6/2006 |
| JP | 09-093378 | 4/1997 |
| JP | 09-093381 | 4/1997 |
| JP | H11-308437 | 5/1999 |
| JP | 2000295439 A * | 10/2000 |
| JP | 2004336249 A * | 11/2004 |
| JP | 2005-311766 | 4/2005 |
| JP | 2005-268906 | 9/2005 |
| JP | 2005268906 A * | 9/2005 |

* cited by examiner

*Primary Examiner* — Scott A Rogers
(74) *Attorney, Agent, or Firm* — Renner, Otto, Boisselle & Sklar, LLP

(57) ABSTRACT

The present invention provides an image processing apparatus which can verify whether or not an image has been able to be correctly read and easily correct an image which has not been able to be correctly read. The image processing apparatus has a reading section 105, an image processing section 110 for image-processing a read image, and a CPU 110 for controlling the entire apparatus. The image processing section 110 has a detection section 101 for detecting an image in a different state, a verification section 102 for displaying an image in a different state, and a correction section 106 for correcting the image. The image processing section 110 has a preview function for displaying the read image on a display section 108, and a correction function for correcting the image. The image processing apparatus can correct only a tilted image without rereading all images.

9 Claims, 8 Drawing Sheets

IMAGE PROCESSING APPARATUS

BACKGROUND OF THE INVENTION

1. Field of the Invention

The present invention relates to an image processing apparatus in which, when an image is read, the read image is displayed.

2. Description of the Related Art

In recent years, high image quality or advanced functions of a digital color copying machine have been progressively improved, which has been able to meet users' expectations with respect to colors or editing processes of output images. In such circumstances, a copying machine having a preview function for displaying an image for verification in order to obtain a desired output image, instead of outputting the image on recording sheets many times, has been a commercial reality.

For example, Japanese Patent Laid-Open No. 09-93378 discloses an image processing apparatus in which, when a preview key and an image reading key are depressed, an output image is displayed on a display section by a preview processing section so that a user can verify an output state of the image before outputting the image.

After multiple images have been read, when the images are previewed, for example, if there is an image in such a different state as has been tilted and read, it can be verified that there is an image which has not been appropriately scanned. However, in order to correctly read the image, it is necessary to read the multiple images again, which makes processing efficiency significantly low.

Consequently, in view of the problem, an object of the present invention is to provide an image processing apparatus which can verify whether or not an image has been able to be correctly read and easily correct an image which has not been able to be correctly read.

SUMMARY OF THE INVENTION

To attain the object, the present invention provides an image processing apparatus including a reading section for reading an image, a detection section for detecting an image in a different state, and a verification section for, when the image in the different state has been detected, pausing the reading and displaying the image to verify the image.

The reading section reads the image in the different state. Here, the image in the different state is, for example, an image which is different in size from other images, an image which is different in orientation such as longitudinal and lateral orientations, a tilted image or the like.

When the detection section has detected that the image is tilted, the orientation of the image is different from previous images, or the size of the image is different from its size detected at the time of reading the image, the detection section determines that the image is in the different state.

When the detection section has detected the image in the different state, the verification section pauses the reading in the reading section and displays the read image in that state. At this time, when the verification section displays the image in the different state, the verification section changes a part of the image for annunciation and displays the changed image. Thereby, it is possible to verify whether or not the read image has been correctly read. In other words, if the image has not been correctly read, the image is displayed in a highlighted manner, which enables a user to recognize it immediately.

With a configuration provided with a correction section for, when it has been verified that the image has not been correctly read, that is, the image is an abnormal image, correcting the abnormal image, the displayed abnormal image can be corrected. Here, the correction of the image includes the case of modifying a tilt of the displayed image and the case of reading the abnormal image again.

An operation section for determining a process after the image in the different state has been verified is provided, and any of restarting of the reading, rereading and correction can be selected by the operation section. Thereby, the user can select the process in order to correctly read the image, as appropriate.

For example, if the correction has been selected when the displayed image has been tilted, the correction section modifies the tilt of the image. If the correction section modifies the tilt of the image, the correction section detects a tilt angle from the tilt of the image and automatically corrects the image based on the tilt angle. Alternatively, the tilt of the image is manually modified based on an input from the operation section. Thereby, it is not necessary to read the abnormal image again.

If the rereading has been selected, when the reading section has reread the same image, the verification section deletes previous image data and displays a subsequent image. When the verification section replaces the image, the verification section verifies whether or not the reread image has been correctly read. If the reread image has been correctly read, the verification section replaces the image.

When the image has not been correctly read, in order to enable the user to easily recognize an abnormal state, an image enlargement section for enlarging the displayed image is provided. Thereby, it becomes easy to verify whether or not the image has been correctly read. Moreover, it is also possible to verify whether or not there is another different state other than the tilt, for example, whether or not there is a thin spot, a portion which has not been appropriately read, or the like on the image.

It should be noted that, in order to enable the different state to be easily recognized, in addition to the enlargement of the displayed image, an image reduction section for reducing the displayed image may be provided. Alternatively, an image moving section for moving the displayed image may be provided. Thereby, when the entire image cannot be displayed, the entire image can be displayed by reducing the image. When a part of the display has been cut, the image can be displayed so that the entire image may be put in the display, by moving the image.

Even if the image sizes are different, some combination of images can be correctly read without being tilted. For example, in the case of reading a longitudinal A5 image and a lateral A4 image, since a length of a longer side of A5 is equal to a length of a shorter side of A4, even if the longitudinal A5 image is read after the lateral A4 image has been read, the longitudinal A5 image can be correctly read without being tilted. Consequently, when the different sizes are mixed, if a specific size is detected, the verification section prohibits an image of the specific size from being displayed. Thereby, when the image of the specific size, especially a size smaller than other sizes, has been detected, the verification section prohibits an image which is highly likely to be correctly read from being displayed.

When the reading section has reread the same image, the verification section deletes the previous image data and displays the subsequent image. At this time, the reading section does not read multiple images again but reads only the abnormal image again. Then, the verification section replaces the previous abnormal image with a subsequent normal image and displays the image. Thereby, not all images are read again, which improves processing efficiency.

As described above, in the present invention, while the images are read, each time the image in the different state is detected, the reading is paused and the image is displayed. If it is verified that the image has been correctly read, the reading can be directly continued. If the image has not been correctly read, the normal image can be obtained on the moment. Therefore, it is possible to eliminate a wasteful processing of also reading normal images again due to an existence of the abnormal image, and also possible to improve image processing efficiency.

DETAILED DESCRIPTION OF THE PREFERRED EMBODIMENTS

Figure 1:
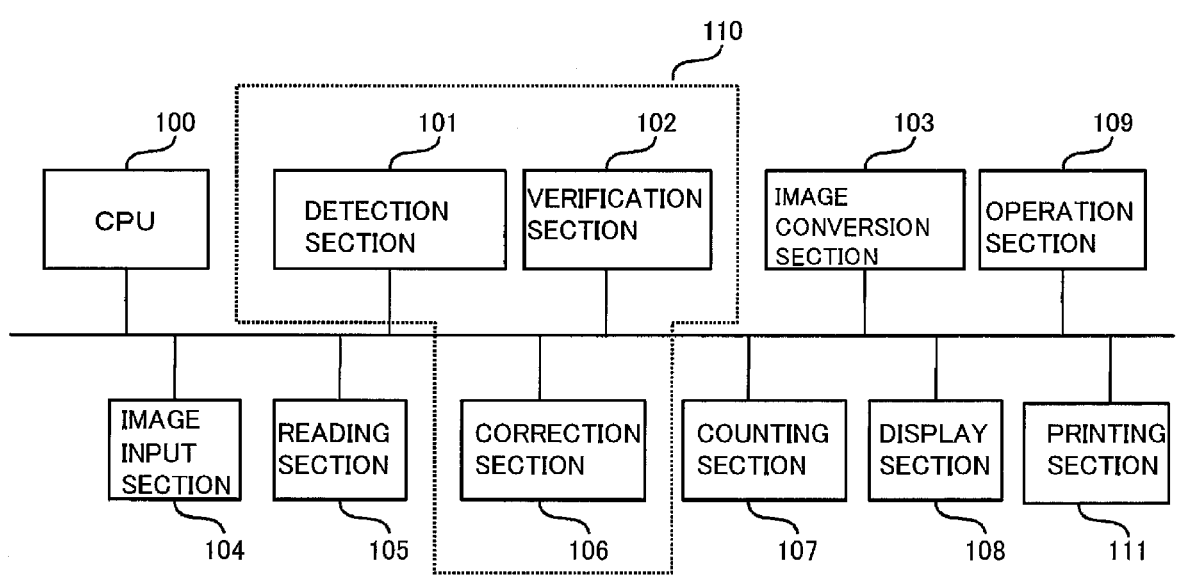
FIG. 1 is a block diagram of an image processing apparatus according to this embodiment.

As shown in FIG. 1, an image processing apparatus of this embodiment has an image input section 104 for setting multiple documents, a reading section 105 for sequentially reading images of the set documents one by one, a display section 108 for displaying the read images, an image processing section 110 for image-processing the read images, an image conversion section 103 for converting the read images, a printing section 111 for printing the converted images, a counting section 107 for counting the number of the read images, an operation section 109 for accepting an input from a user, and a CPU 100 for controlling the entire apparatus. Here, as the image processing apparatus, an example of a composite machine provided with a scanner function, a printing function, a FAX function and the like will be described.

The image processing apparatus is provided with a communication section for performing communication with an external apparatus like another image processing apparatus or a terminal apparatus such as a personal computer. The communication section is connected to the external apparatus via a network or telephone lines so that data communication and facsimile communication may be enabled. Moreover, the image processing apparatus is provided with a storage section like a hard disk apparatus for storing image data or various information and a memory for temporarily storing the image data.

The reading section 105 is a scanner. The reading section 105 reads the images of the documents set in the image input section 104 and inputs those images as data. Alternatively, the image data is inputted by data transmission from the external apparatus. The inputted image data is outputted to the image processing section 110. The counting section 107 counts the number of the read images, from the reading section 105. The counted number is displayed on the display section 108 based on an instruction from the CPU 100.

The operation section 109 is provided with various operation keys. The operation section 109 instructs operations of the entire image processing apparatus, or inputs various settings.

The display section 108 consists of a liquid crystal display, and displays contents of inputs or operation statuses of the entire image processing apparatus. The display section 108 is a touch panel. Touch keys are formed within an operation screen displayed on the display section 108, and these touch keys also function as the operation section 109.

The image processing section 110 performs image processing such as editing and processing of the image data. Moreover, the image data is also outputted by transmitting the image data to the external apparatus.

The CPU 100 executes instructed processes with respect to the image data. In other words, in response to the input from the operation section 109 or the data input from the external apparatus, the CPU 100 controls the respective sections based on programs stored in the storage section to execute processing of the image data. The CPU 100 executes any of a copy mode, a print mode, a scanner mode and a facsimile mode with respect to the image data, and outputs the image in a desired form.

Figure 2:
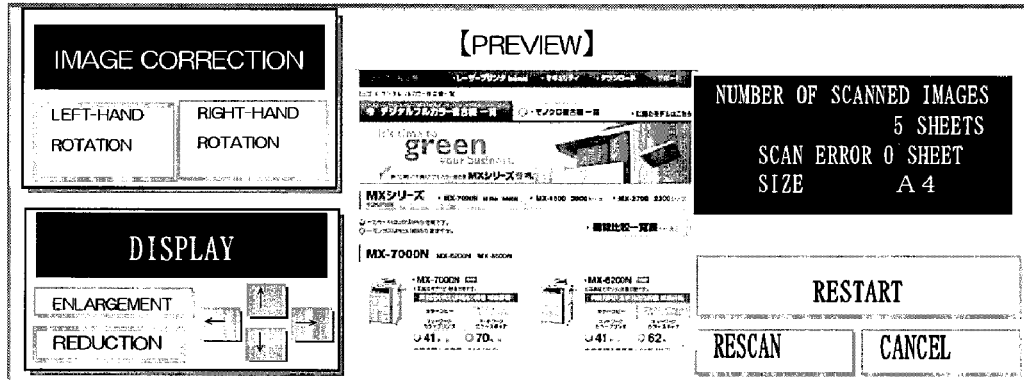
FIG. 2 is a diagram showing a preview screen.
Figure 3:
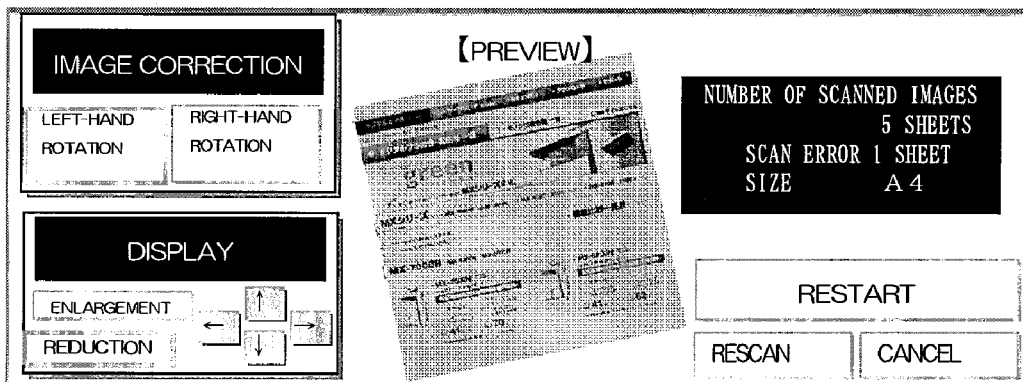
FIG. 3 is a diagram showing an image in a different state.
Figure 4:
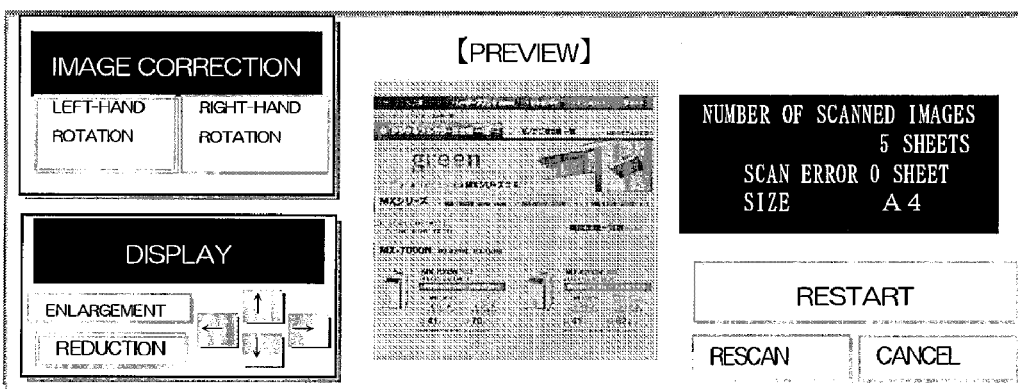
FIG. 4 is a diagram showing the case where correction of an image in a different state has been completed.

As shown in FIG. 2, the image processing section 110 has a preview function for displaying the read image on the display section 108 to verify whether or not the read image has been correctly read. As shown in FIGS. 3 and 4, the image processing section 110 has a correction function for, when it has been verified that the displayed image has not been correctly read, correcting the image. In other words, the image processing section 110 has a detection section 101 for detecting an image in a different state from the read images, a verification section 102 for, when the image in the different state has been detected, pausing the reading section 105 and displaying the image in the different state on the display section 108, and a correction section 106 for, when the displayed image has not been correctly read, correcting the image.

From the read image, the detection section 101 detects a size or an orientation of the image. Then, when the detection section 101 detects that the size or the orientation has been changed, by comparing the image with a previously read image or referring to a size or an orientation which has been set, the detection section 101 determines that the image is in the different state. Then, the detection section 101 outputs a result of the determination to the CPU 100.

For example, if multiple images of different sizes such as B4 and A4 are read, when the detection section 101 detects an A4 image following a B4 image, the detection section 101 outputs the fact that the image in the different state has been read, to the CPU 100. If multiple images of different orientations such as longitudinal and lateral orientations are read, when the detection section 101 detects a lateral image following a longitudinal image, the detection section 101 outputs the fact that the image in the different state has been read, to the CPU 100.

When the detection section 101 has detected the image in the different state, the verification section 102 displays the image read by the reading section 105 in that state on the display section 108, based on an instruction from the CPU 100. Then, the verification section 102 verifies whether or not the image has been correctly read, that is, whether or not the image is an abnormal image. Here, the abnormal image is an image such as a read image which is tilted or a read image having a thin spot.

The verification section 102 automatically determines whether or not the image is tilted, from the read image. In this case, the verification section 102 performs the determination by extracting edges of the read image and determining whether or not the edges are tilted with respect to a vertical direction. Instead of automatic verification, the user may perform the verification and input the operation. At this time, as shown in FIG. 2, the verification section 102 displays operation buttons functioning as the operation section 109, such as a restart button, a rescan button, a cancel button, an image correction button and a display button, on the display section 108. The user visually determines whether or not the image is tilted, from the image displayed on the display section 108. Specifically, if the user determines that the image is not tilted, the user depresses the restart button. If the user determines that the image is tilted, the user depresses the rescan button or the image correction button. The verification section 102 verifies whether or not the image is tilted, from a result of the determination inputted from the operation section 109. It should be noted that whether the determination is performed by the verification section 102 or the user is initially set. Alternatively, the user selects it each time.

When it has been verified that the image is tilted, the verification section 102 announces to the user that the image is tilted. For example, the verification section 102 changes colors of the image.

When the image of the different size has been detected, if the image size is a specific size which has been previously set, the verification section 102 prohibits the image from being displayed. Specifically, the user sets the specific size which is not displayed. For example, in the case of images of documents in which a longitudinal A5 image and a lateral A4 image are mixed, the A5 image is set as the specific size. When the detection section 101 has detected a different image, the verification section 102 verifies whether or not the detected image is the image of the A5 size which has been set. If the detected image is the image of the A5 size, the verification section 102 prohibits the image from being displayed. If the detected image is an image of a size other than the A5 size, the verification section 102 displays the image.

The correction section 106 performs correction for modifying a tilt of the displayed image. The correction section 106 detects a tilt angle from the tilt of the image and corrects the image based on the tilt angle. At this time, there are the case of calculating a rotation angle from the detected tilt angle and automatically correcting the tilt, and the case where the operation section 109 for rotating the image is provided on the display section 108 and the tilt of the image is manually modified based on an input from the user. It should be noted that it is possible to select which correction is performed.

As the correction, in addition to the rotation of the image, the image of the document may be read again. In this case, the user sets the image to be read again in the image input section 104 and the image of the document is read. Then, the correction section 106 replaces the image which has not been correctly read with the image which has been read again.

Figure 5:
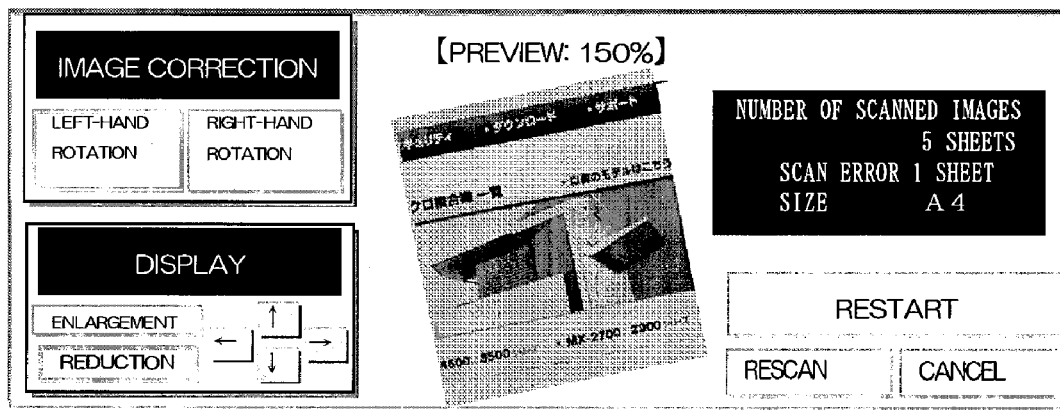
FIG. 5 is a diagram showing the case where the image in a different state has been enlarged.

As shown in FIG. 5, the verification section 102 is provided with an image enlargement section for enlarging the displayed image in order to enable a tilted state to be easily recognized when the tilted image is corrected. The image enlargement section enlarges the displayed image based on an enlargement ratio set by an input from an input section displayed on the display section 108 by the correction section 106, or an enlargement ratio which has been previously determined. Specifically, the image is enlarged by depressing an enlargement button shown in FIG. 5.

The verification section 102 is provided with an image reduction section for reducing the enlarged image and an image moving section for moving the image within the display section 108. These operations are operated by the input section displayed on the display section 108. Specifically, in the case of reducing the image, the image is reduced by depressing a reduction button shown in FIG. 5. In the case of moving the image, the image is moved by depressing a direction indicating button shown in FIG. 5, in a direction shown by an arrow of the depressed direction indicating button.

It should be noted that although the enlargement and the reduction of the image are performed based on the same ratio in longitudinal and lateral sizes, the enlargement and the reduction of the image may be performed based on different ratios in the longitudinal and lateral sizes, respectively. The enlargement or the reduction may be performed only in any one of the longitudinal and lateral sizes and may not be performed in the other one of them. Moreover, the enlargement button, the reduction button and the direction indicating button are the touch keys within the operation screen displayed on the display section 108, and function as the operation section 109.

When the image processing related to the correction of the image as described above is performed, the CPU 100 sets processing conditions for executing image processing functions, and stores the processing conditions in the storage section. The image processing section 110 expands the image data on the memory, virtually forms the images, and performs the modification, the enlargement, the reduction, the moving and transformation of the individual images. The image processing section 110 outputs the transformed image data to the storage section, and the storage section stores the image data. The image conversion section 103 reads the image data from the storage section to convert the image data into image data to be printed, and the printing is performed by the printing section 111.

Next, a procedure of an image reading function of this embodiment will be described according to FIGS. 6 to 11. Here, an example in the case of reading the multiple images of the different sizes and printing the read images on recording sheets will be described.

When the multiple images of the different sizes are set in the image input section 104 (S201), and an operation input for executing the image reading function is provided by the user via the operation section 109, the CPU 100 starts the image reading function.

Figure 6:
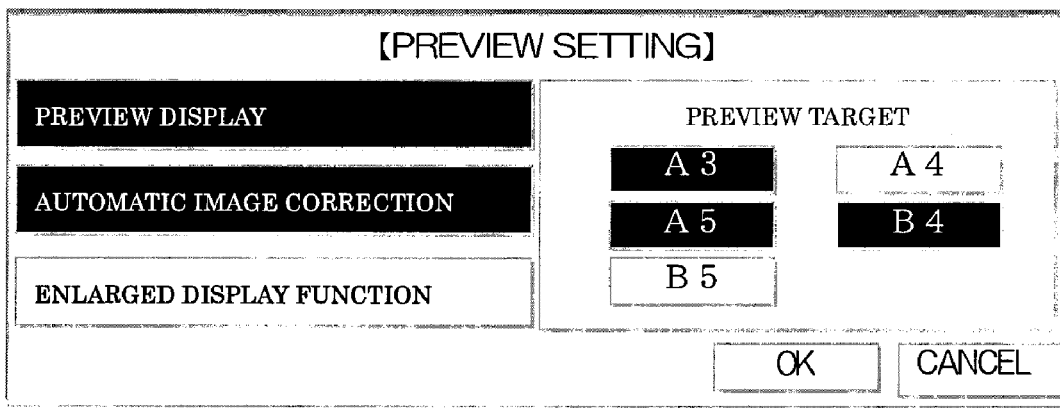
FIG. 6 is a diagram showing a setting screen.
Figure 7:
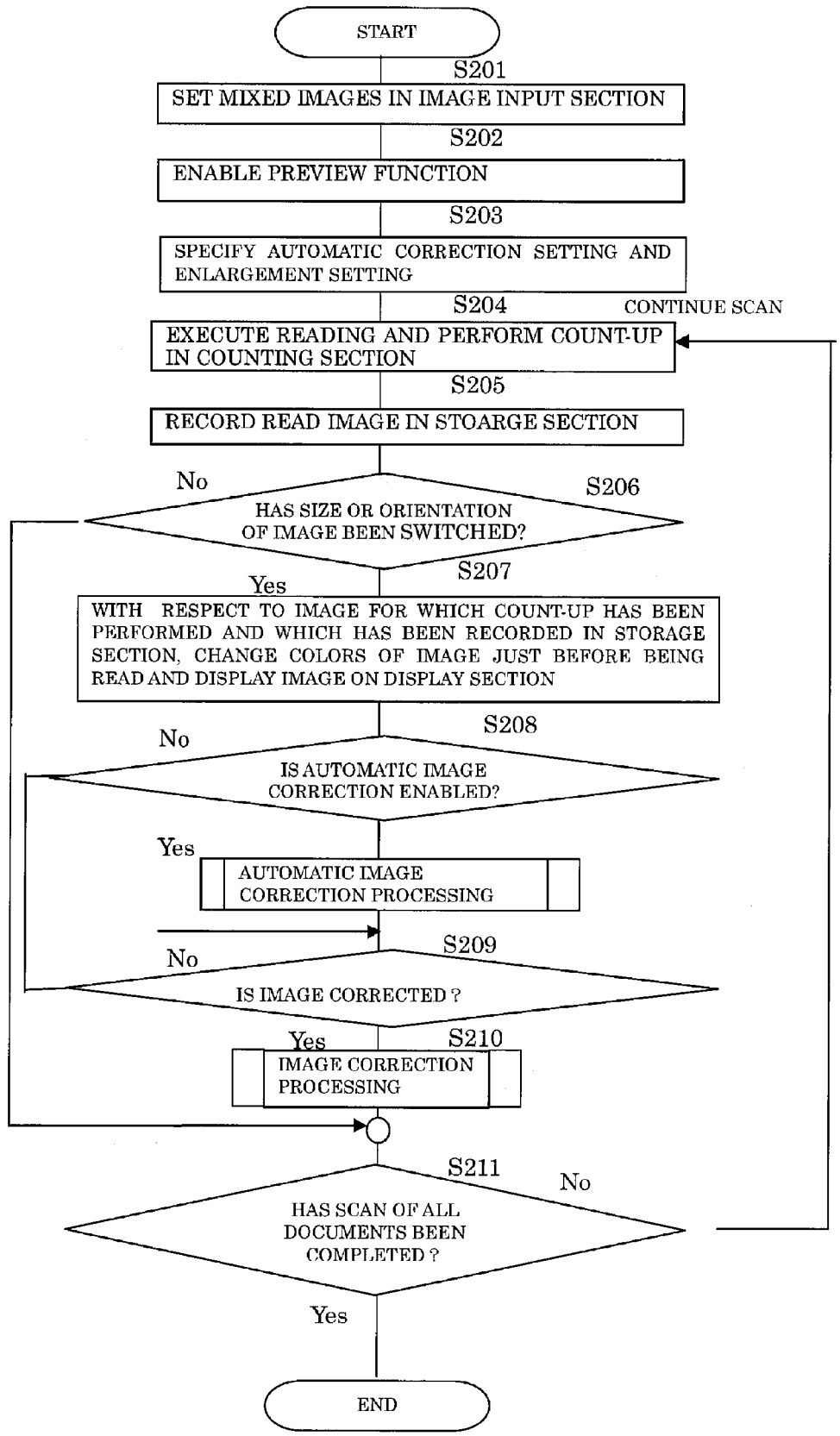
FIG. 7 is a diagram showing a flowchart of an image reading function procedure.

The image processing section 110 displays such a screen as shown in FIG. 6 for setting the reading, the correction or the like of the image. The user depresses "preview display" in FIG. 6 to select whether or not to display a preview screen (S202). If the user has selected to display the preview screen, the user sets the image size which is prohibited from being displayed on the preview screen. Specifically, the user selects sizes to be previewed by depressing buttons of those sizes, among image sizes shown in FIG. 6. Thereby, images of sizes which have not been selected are prohibited from being displayed on the preview screen. The user sets whether or not to automatically perform the correction of the image, and sets whether to enable or disable functions of enlarging and reducing the displayed image during the correction (S203).

After the settings have been completed, the image processing apparatus waits for the operation input from the user and starts the reading of the image. In the image processing section 110, the image of the document is inputted from the reading section 105. Then, the counting section 107 counts the number of the images read by the reading section 105 (S204). The image processing section 110 stores the read image in the storage section (S205).

The detection section 101 detects whether or not the size or the orientation of the image has been switched, each time the image is read (S206). If the size or the orientation of the image has not been switched, the reading is directly continued until the size or the orientation of the image is switched or until the reading is completed (S211).

If the detection section 101 detects that the size or the orientation of the image has been switched, the verification section 102 pauses the reading. Then, based on setting information, the verification section 102 displays the image in which its size or orientation has been switched and the count number at the time of reading the image, on the display section 108. Furthermore, the verification section 102 verifies the tilt of the image based on the setting information. In the case of manually verifying whether or not the image is tilted, the user determines whether or not the image is tilted, from the input section displayed on the display section, and inputs the determination result. In the case of automatically verifying whether or not the image is tilted, the verification section 102 performs the determination.

If it has been determined that the image is not tilted, when an operation input for restarting the image reading function is provided by the user, that is, specifically, when the user depresses the restart button shown in FIG. 2, the reading is restarted. If it has been determined that the image is tilted, the verification section 102 changes the colors of the displayed image so that the user can recognize that the image has been tilted and read (S207).

Figure 8:
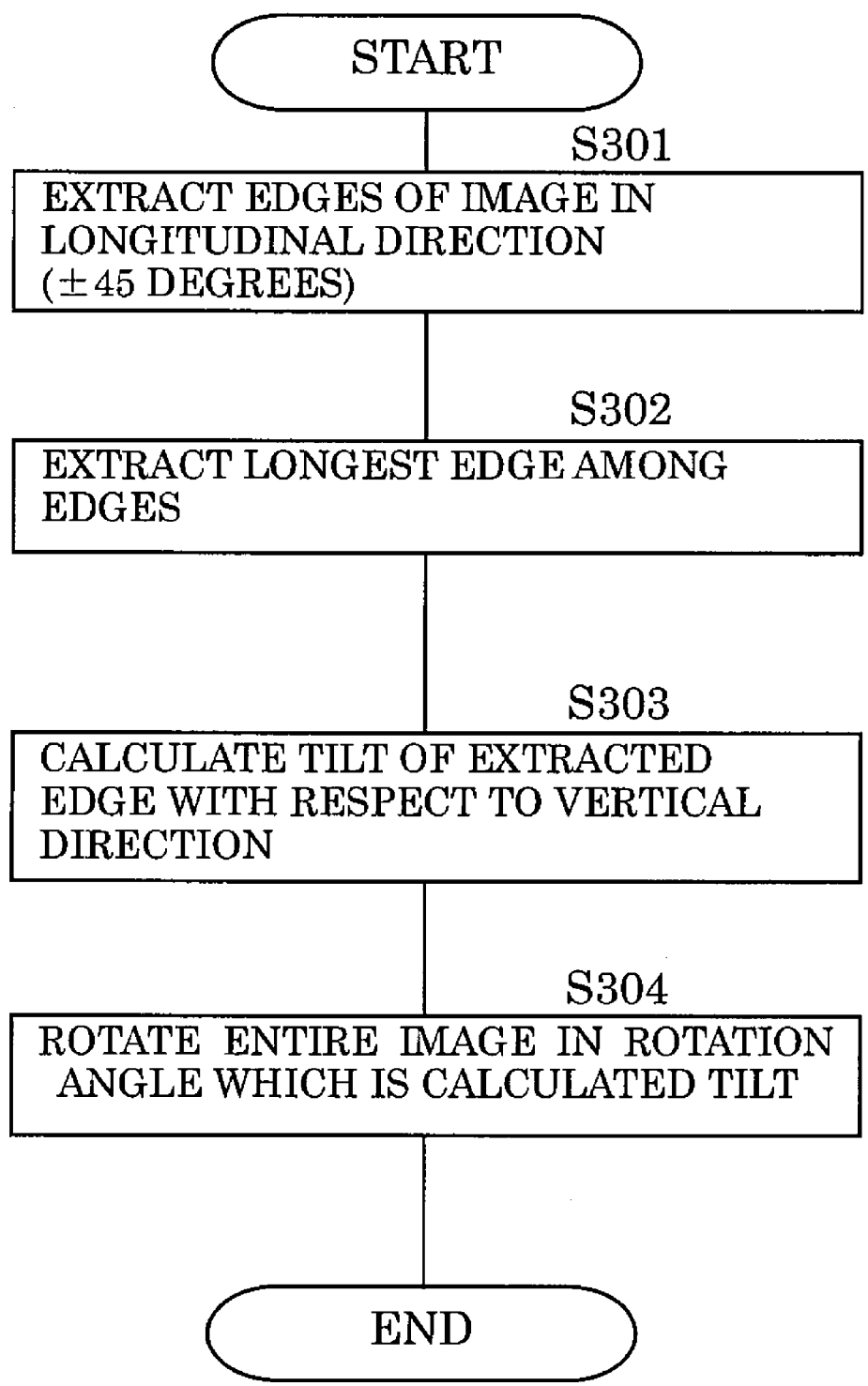
FIG. 8 is a diagram showing a flowchart in the case of automatically correcting the image.

Then, the correction section 106 verifies whether the automatic correction is enabled or disabled. If the automatic correction is enabled, as shown in FIG. 8, first, the correction section 106 extracts edges of the image in a longitudinal direction (S301). The correction section 106 extracts the longest edge among the extracted edges (S302). The correction section 106 calculates the tilt of the extracted long edge with respect to the vertical direction (S303). The correction section 106 corrects the tilt by rotating the entire image in the rotation angle which is the calculated tilt, and completes the automatic correction (S304). Then, as shown in FIG. 4, the corrected image is displayed on the display section 108, and with respect to the user, it is confirmed whether or not to complete the correction of the image (S209). If the correction is not completed, operations of S402 to S406 are performed as will be described later.

If the automatic correction is not enabled, it is confirmed whether or not to correct the image, with respect to the user (S209). If the tilt is not corrected, as described above, the user depresses the restart button to restart the image reading function. When the restart button is inputted, the reading section 105 restarts the reading.

Figure 9:
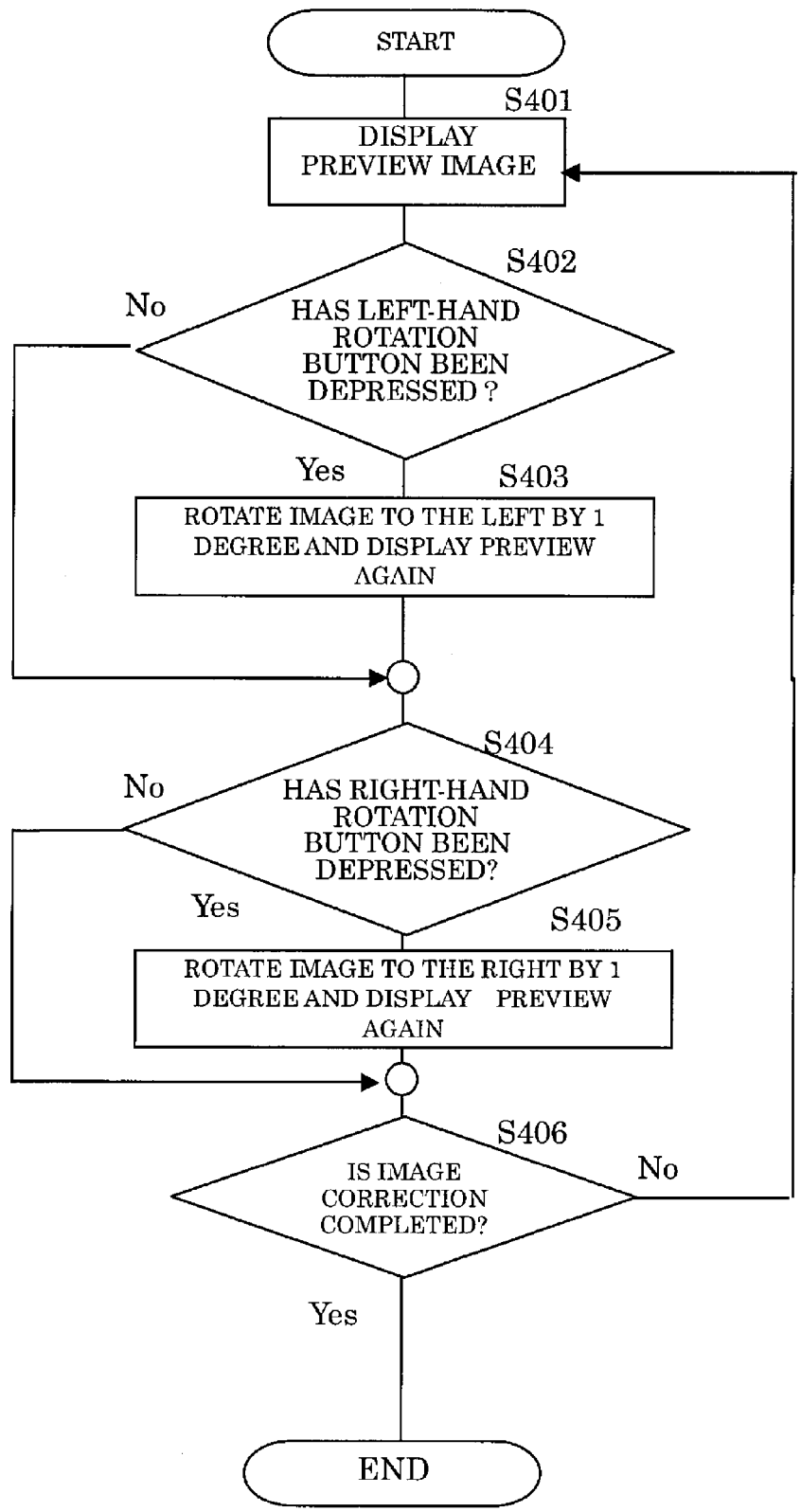
FIG. 9 is a diagram showing a flowchart in the case of manually correcting the image.

If the tilt is corrected, the user provides an operation input for starting an image correction function. The CPU 100 starts the correction as shown in FIG. 9 (S401). The user depresses a left-hand rotation button or a right-hand rotation button depending on the tilt of the image. The correction section 106 performs a rotation process with respect to the image based on the input, and displays the rotated image on the display section (S402 to S406). It is confirmed whether or not the correction of the image has been completed (S406), and if the correction has not been completed, the operations of S402 to S406 are performed until the correction is completed. When the correction is completed, the user depresses the restart button. When the input of the restart button is detected, the reading section 105 restarts the reading.

It should be noted that the last operation which has been previously performed is disabled if the cancel button is depressed. For example, if the user hopes to redo the automatic correction by the correction section 106, the user depresses the cancel button. This depression disables the automatic correction performed by the correction section 106. Moreover, when the tilt of the image has been corrected, the colors of the displayed image are changed into colors for displaying a normal image.

When the operation input for restarting the image reading function is provided by the user, the correction is completed and the reading is restarted. At this time, the verification section 102 verifies whether or not all images have been read. If there is any image to be read, the reading is directly continued. If there is no image to be read, the read images are outputted to the image conversion section 103 and printed on print sheets, and the process is completed (S211).

Figure 10:
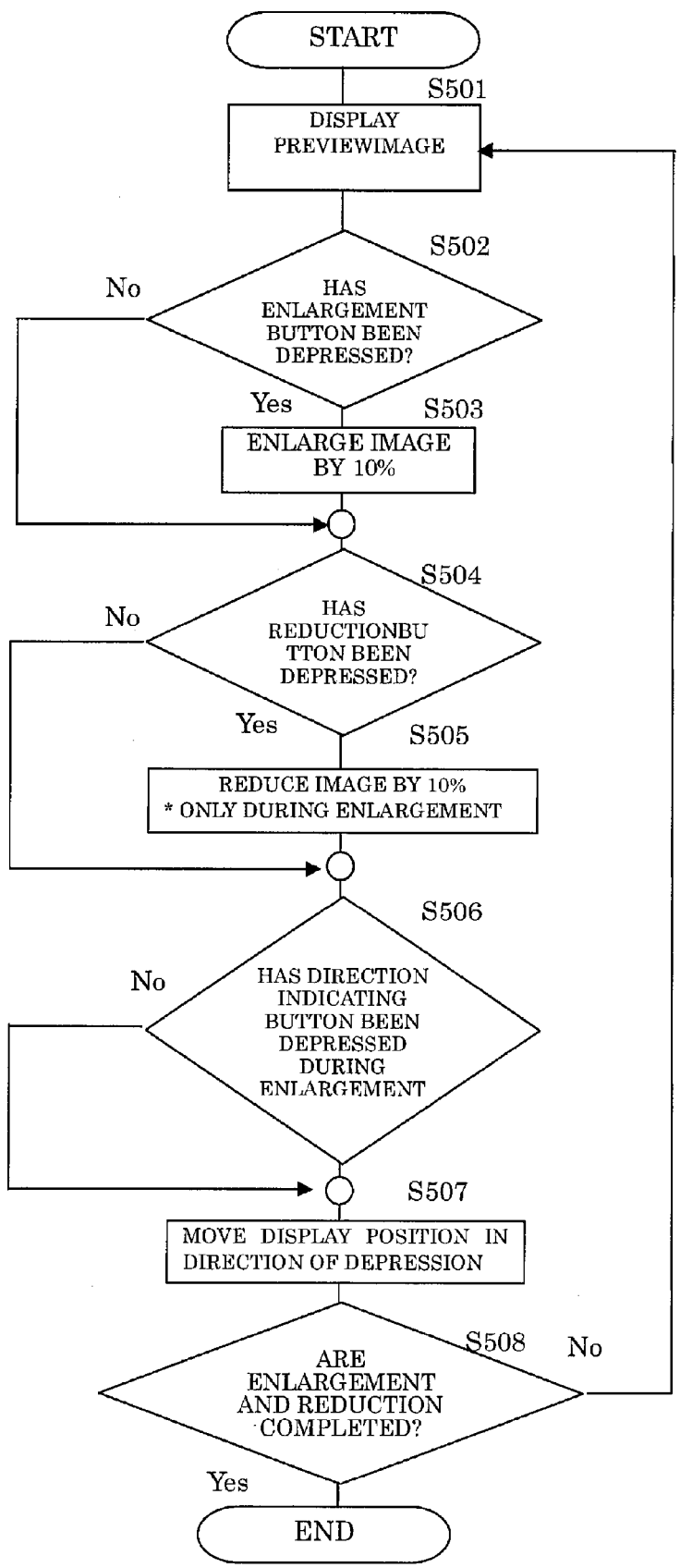
FIG. 10 is a diagram showing a flowchart in the case of enlarging, reducing or moving the image.
Figure 11:
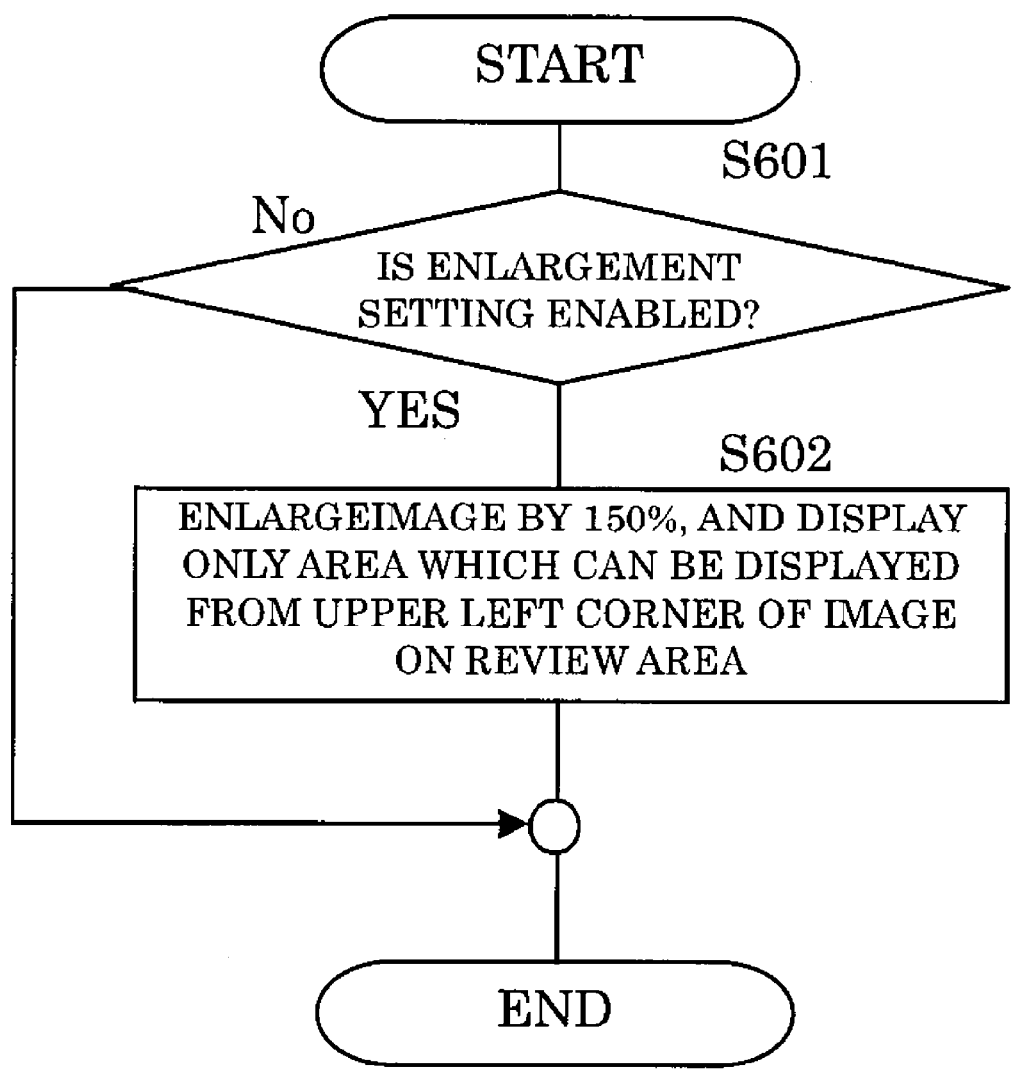
FIG. 11 is a diagram showing a flowchart for displaying the image if the image has been enlarged.

Incidentally, in the case of the manual correction, it may be difficult to recognize the tilt. In this case, the image is enlarged as shown in FIG. 5. Specifically, as shown in FIG. 10, first, the preview screen is displayed by the correction section 106 (S501). When the enlargement button is depressed (S502), the image is enlarged based on the enlargement ratio which has been set (S503). Specifically, as shown in FIG. 11, the image enlargement section verifies whether or not the enlargement setting is enabled (S601). If the enlargement setting is not enabled, the enlargement is not performed and the processing is completed. If the enlargement setting is enabled, based on the enlargement ratio which has been set, only an area which can be displayed from an upper left corner of the image is displayed on the display section 108 (S602). It should be noted that, if the reduction button is depressed (S504), the enlarged image is reduced based on a reduction ratio which has been set (S505).

When the image has been enlarged or reduced, if a portion which the user hopes to verify is out of the display section 108 and is not displayed, the depression of the direction indicating button (S506) moves a display position of the image in the direction shown by the arrow of the depressed direction indicating button (S507). Then, it is verified whether or not the position has been able to be adjusted so that the tilt of the image can be easily verified (S508). If the adjustment is required, operations of S502 to S508 are performed until the adjustment is completed. If the adjustment has been completed, the correction of the tilt of the image is started.

When the detection section 101 has determined that the image is in the different state and the image has been displayed on the preview screen, the image may be only different in size and may have been correctly read. At this time, the restart button is depressed. The verification section 102 recognizes that the image is a correct image, and outputs its image data.

As described above, when the detection section 101 has detected that the read image is in the state which is different from the normal image, the reading is paused, and the image is displayed in order to verify whether or not the image has been read in the different state. In the case of the abnormal image, it is possible to immediately deal with the image on the moment. Moreover, even in the case of the abnormal image, since only the abnormal image is corrected, normal images which have been previously read are retained, which saves the trouble of having to read all images and does not require useless tasks.

It should be noted that the present invention is not limited to the above described embodiment, and of course, it is possible to add many modifications and alterations to the above described embodiment within the range of the present invention.

In the present invention, if the image is tilted, the correction is performed based on the display of the image. However, the image may be reread. For example, if it has been verified that the read image is tilted, the user verifies the count number and the image displayed on the display section, and sets the image to be reread in the image input section. Then, when an operation input for rereading the image is provided by the user, the reading section performs the rereading. The verification section replaces the tilted image with the reread image and displays the image. When the tilt has been eliminated, the reading is restarted with the operation input for restarting the image reading function from the user. If the tilt has not been eliminated, the rereading is performed until the tilt is eliminated.

It should be noted that, if the rereading is performed, since the images are continuously read in the case of a normal image processing apparatus, the next image may have been inserted in the reading section when the tilted image has been detected. Consequently, when the rereading is performed, it is necessary to remove all of images which have been set in the image input section and images which have been transferred into the image processing apparatus, and reset those images so that the reading can be started from the image to be reread.

When the different image is displayed, the colors of the image are changed in order to have the user recognize the different image, which however is not particularly limited thereto. A sound may be used for annunciation thereof. Moreover, the image may be blinked. In other words, any annunciation may be possible if its mode is recognizable to the user. The correction is automatically performed by the correction section or manually performed by the user, which however is not particularly limited thereto. For example, after the automatic correction by the correction section, further fine adjustments may be manually made. Thereby, the user can obtain a desirably tilted image.

What is claimed is:

1. An image processing apparatus comprising:
   a reading section for reading an image;
   a detection section for detecting an image in a different state; and
   a verification section for, when the image in the different state has been detected, pausing the reading and displaying the image to verify the image; and
   a correction section for correcting an image in a different state, wherein:
   when the detection section detects an image in the different state, reading is paused temporarily;
   when a tilted image has been detected, the correction section detects a tilt angle from a tilt of the image and automatically corrects the image based on the tilt angle;
   the verification section displays the corrected image;
   when the correction has not been completed or the automatic correction has not been performed, the correction portion corrects the tilted image depending on a user input operation; and
   the reading section restarts reading after completion of correction.

2. The image processing apparatus according to claim 1, wherein:
   when the verification section displays the image in the different state, the verification section changes a part of the image for annunciation and displays the changed image.

3. The image processing apparatus according to claim 1, further comprising:
   an operation section for rotating the displayed image,
   wherein the correction section processes the image rotated by an input from the operation section, as the corrected image.

4. The image processing apparatus according to claim 1, further comprising:
   an image enlargement section for enlarging the displayed image.

5. The image processing apparatus according to claim 1, further comprising:
   an image reduction section for reducing the displayed image.

6. The image processing apparatus according to claim 1, further comprising:
   an image moving section for moving the displayed image.

7. The image processing apparatus according to claim 1, wherein:
   an operation section for determining a processing after the image in the different state has been verified is provided; and
   any of restarting of the reading, rereading and correction can be selected by the operation section.

8. The image processing apparatus according to claim 7, wherein:
   when the reading section has reread the same image, the verification section deletes previous image data and displays a subsequent image.

9. An image processing apparatus comprising:
   a reading section for reading an image;
   a detection section for detecting an image in a different state; and
   a verification section for, when the image in the different state has been detected, pausing the reading and displaying the image to verify the image, wherein:
   when images of different sizes are mixed, if an image of a specific size is detected, the verification section prohibits the image of the specific size from being displayed.

* * * * *